April 7, 1970   G. B. RULLMAN   3,505,072
METHOD AND APPARATUS FOR OPERATING A SINGLE LINE CONVEYOR
Filed June 9, 1969   8 Sheets-Sheet 1

INVENTOR
George B. Rullman
BY
ATTORNEYS

INVENTOR
George B. Rullman
BY
ATTORNEYS

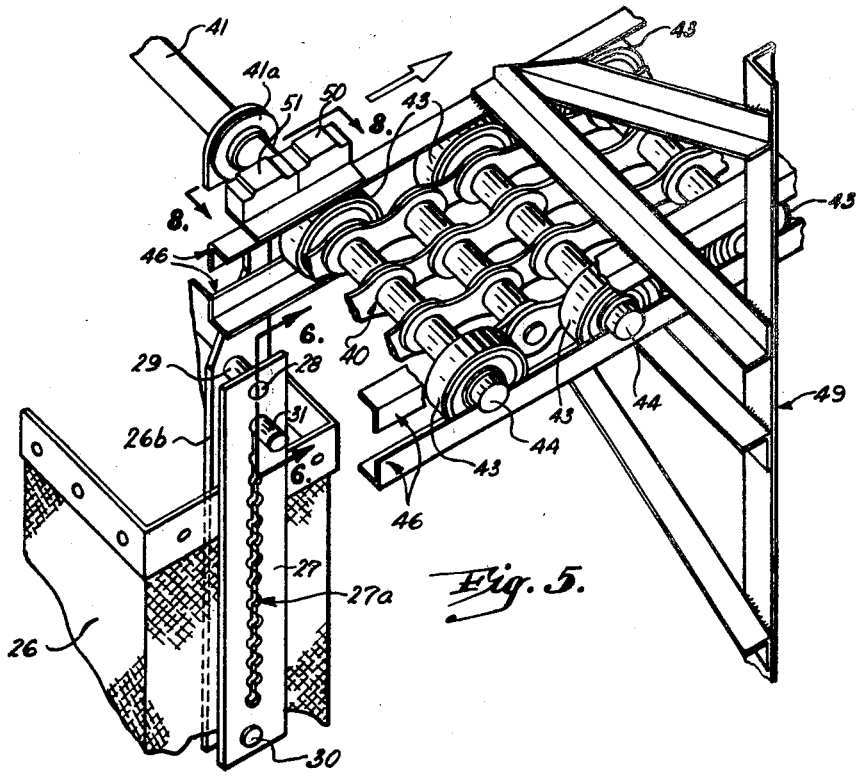
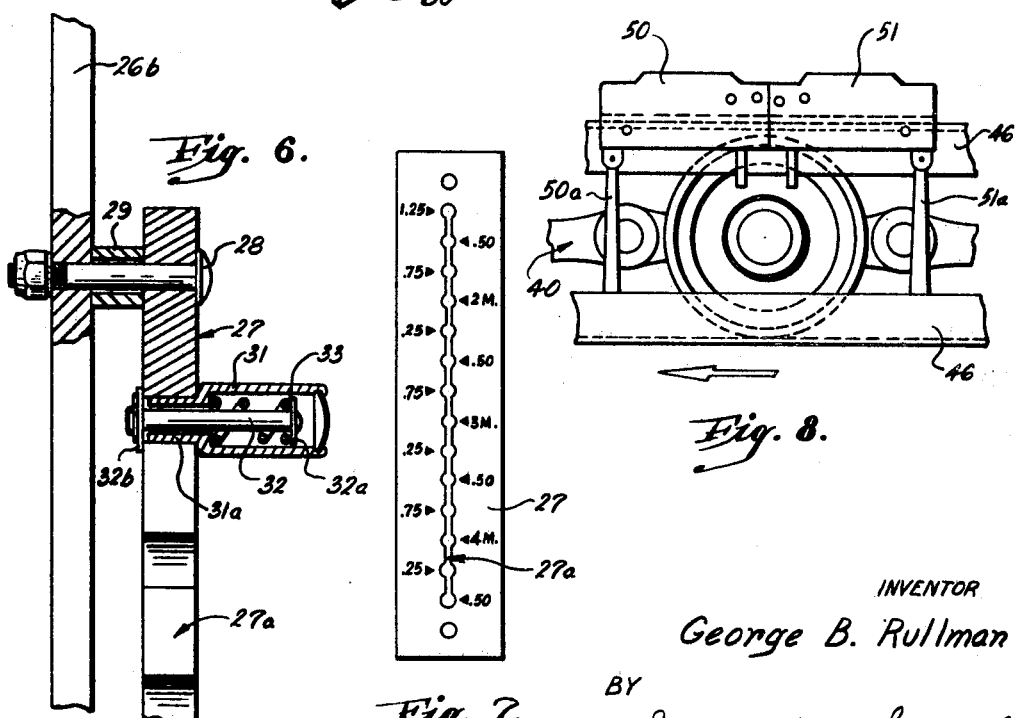
INVENTOR
George B. Rullman

INVENTOR
George B. Rullman

April 7, 1970   G. B. RULLMAN   3,505,072
METHOD AND APPARATUS FOR OPERATING A SINGLE LINE CONVEYOR
Filed June 9, 1969   8 Sheets-Sheet 6

INVENTOR
George B. Rullman

BY
ATTORNEYS

April 7, 1970 G. B. RULLMAN 3,505,072
METHOD AND APPARATUS FOR OPERATING A SINGLE LINE CONVEYOR
Filed June 9, 1969 8 Sheets-Sheet 7

INVENTOR
George B. Rullman

BY
ATTORNEYS

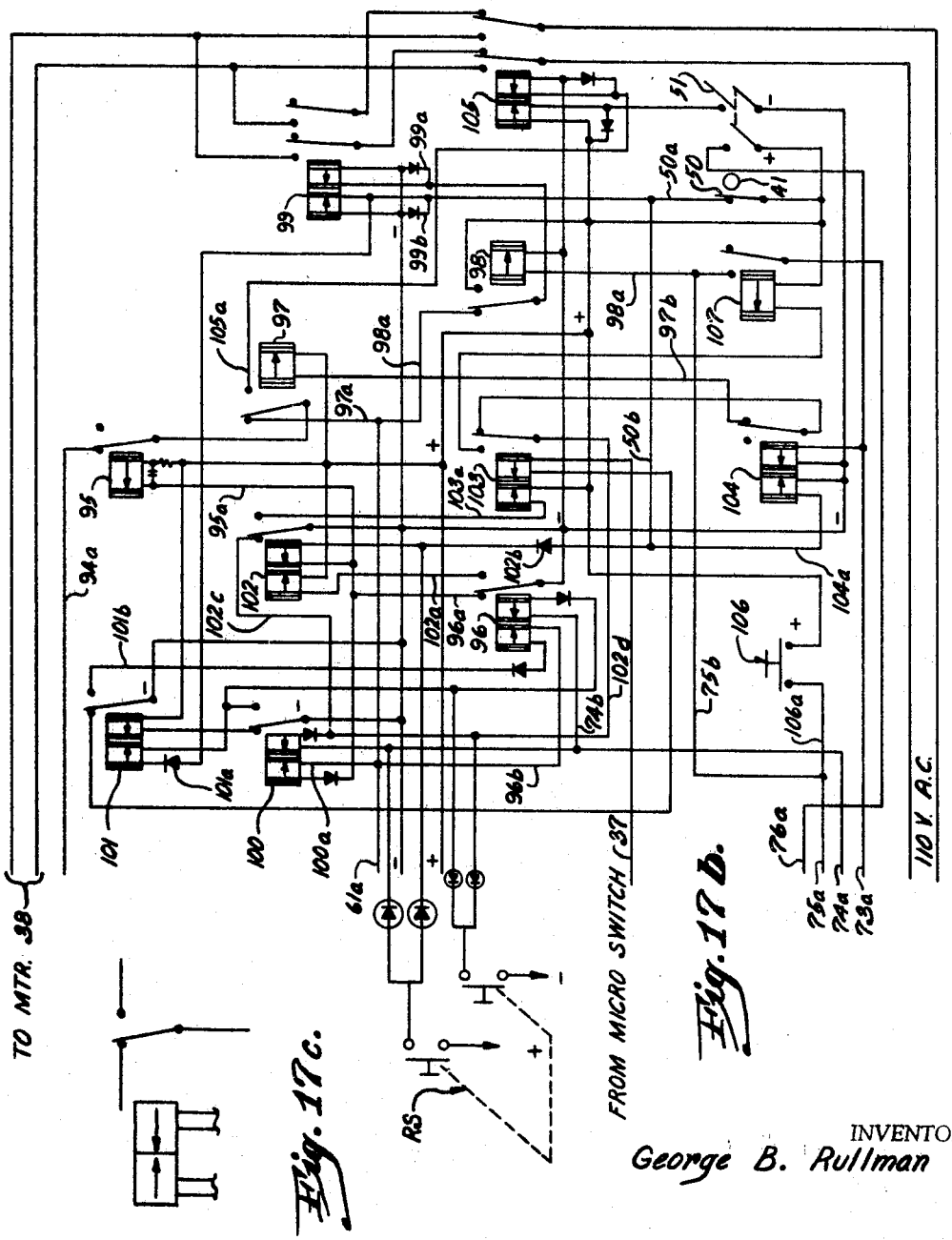

United States Patent Office 3,505,072
Patented Apr. 7, 1970

3,505,072
METHOD AND APPARATUS FOR OPERATING A SINGLE LINE CONVEYOR
George B. Rullman, 738 E. 7th St.,
Hastings, Nebr. 68901
Filed June 9, 1969, Ser. No. 831,487
Int. Cl. A47j 37/12
U.S. Cl. 99—1                                              22 Claims

ABSTRACT OF THE DISCLOSURE

A method and apparatus having a single line travel may be utilized for cooking or material processing where accurate control of time at a particular location is very important. The conveying apparatus includes a timing mechanism which automatically regulates and controls the time that particular products, generally food, may be exposed to a processing environment.

The method for processing the material includes the following steps:

Locating preselected amounts of said material on carriers suitable for conveying in a single line conveyor;

Setting the time program for exposure to said processing environment on a device located on each carrier having said material therein; and Conveying said carrier into said processing environment for a time period determined by the time program on said carrier.

BACKGROUND AND BRIEF DESCRIPTION OF THE INVENTION

Heretofore, the usual method of cooking foods, as in french frying, is for the operator to lower a carrier into a vat so that its contents are submerged into the cooking liquid and to raise the carrier when he determines that it should be removed. This method requires the time and attention of the operator and usually results in some foods being overcooked or undercooked and which not only causes a lack of uniformity, but often seriously affects the quality of the finished product. Other attempts have been made at automatically controlling the frying of food in french fry vats and the like and include rotary fryers of the type which must be removed either manually or automatically by passing same through a cooking vat.

My invention utilizes the single line conveyor concept and allows for individual carriers to be appropriately programmed so that they spend only the optimum time in the cooking vat. In this regard, each carrier has a time setting program device on the side thereof which comes in contact with a timer which serves both to remember the processing time of each individual carrier and to monitor the conditions of the cooking vat. At the same time, the timer operates control circuitry to move the carrier into and out of the cooking vat in accordance with the time program period that has been set on each carrier.

A primary object of my invention is to provide a unique method and apparatus for automatically processing material in a single line conveyor system.

Another object of my invention is to provide an improved method and apparatus for automatically cooking foods. It is an important feautre of my invention that the individual quality of the food cooked thereby may be easily controlled and that all cooking is done in a uniform manner.

A further object of my invention is to provide a uniquely constructed apparatus of the character described which facilitates the automatic handling and timing of a carrier which may be used in conjunction with a french frying cooking vat and which takes on the form of a single line conveyor system.

A still further object of my invention is to provide a uniquely constructed apparatus of the character described which permits individual control over various carriers associated with a single line conveyor system so that the cooking of different foods, or of like foods to a different degree of doneness, may be accomplished irrespective of the timing of the preceding or succeeding carriers.

A further object of my invention is to provide a method and apparatus for processing food which may be operated by an inexperienced operator with very little previous experience and with a minimum of instruction.

Another object of my invention is to provide a uniquely constructed timing and monitoring device for monitoring the condition of the cooking vat in a single line conveyor cooking system.

A further object of my invention is to provide in a monitoring device of the character described above, a uniquely constructed memory which automatically records the time programmed for each carrier as same enters into the cooking vat.

A still further object of my invention is to provide a uniquely constructed single line conveyor processing system which fully utilizes the available space within the cooking or processing environment.

Another object of my invention is to provide an apparatus for cooking or material processing which may be easily adapted to existing vats or other processing environments now commonly being used to thereby convert same into automatic handling and timing operations.

Other and further objects of my invention, together with the features of novelty appurtenant thereto, will appear in the course of the following description.

DETAILED DESCRIPTION

In the accompanying drawings, which form a part of the specification, and are to be read in conjunction therewith, like reference numerals are employed to indicate like parts in the various views.

FIG. 5 is a partial perspective view of the conveyor roller chain, roller guides and support frame and carrier rod with a basket carrier and program plate affixed thereto;

FIG. 6 is a partial side sectional view of a carrier showing the programming plate and associated adjustable knob thereon;

FIG. 7 is a front elevational view of the programming plate showing the elongated aperture which comprises the timing slot therein;

FIG. 8 is a partial side elevational view of a portion of the conveyor chain taken generally along the line 8—8 of FIG. 5 in the direction of the arrows;

FIG. 17b is the right hand portion of the above mentioned circuitry; and

FIG. 17c is a diagrammatic representation of a typical reed switch used in the circuitry.

Figures 1, 2:
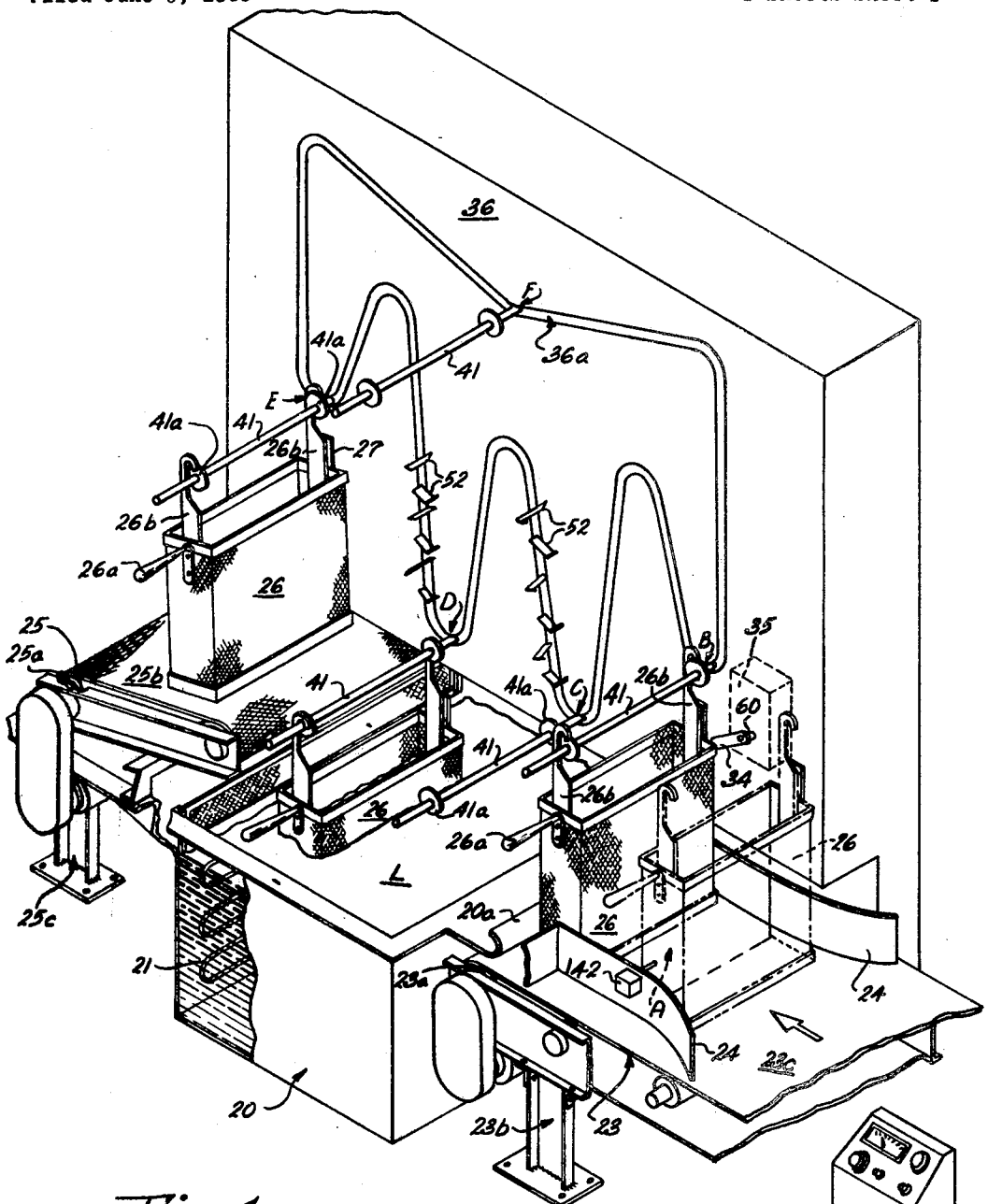
FIG. 1 is a partial perspective view of the forward portion of the conveying apparatus utilized in my invention, same being operatively shown in conjunction with a conventional french frying vat.
FIG. 2 is a perspective view of a conventional type thermostatic control unit for the frying vat shown in FIG. 1.

Turning now more particularly to the drawings, reference numeral 20 is used to designate a conventional fry vat with the liquid L located therein. It is contemplated that heat coils 21 will be conveniently disposed relative to the liquid L and controlled by the conventional thermostatic control unit 22 which may be located adjacent to fry vat 20 or at a remote central control station. The upper surface of the fry vat 20 is exposed for the immersion of food therein and has a rolled lip 20a (flexible or otherwise) at the intake end of the conveying system for the location of a later described food carrier.

A conventional motor driven endless belt conveyor, generally indicated by the numeral 23, is located in communicating relationship with the vat lip 20a. As shown in FIG. 1, the endless belt is drivingly associated with a motor driven rolling mandrel 23a, and supported by legs 23b so that belt 23c is propelled in the direction as shown by the arrow or with the upper surface of same moving toward the vat. The pair of spaced apart deflector plates 24 is positioned relative to the upper surface of belt 23c so that the incoming food carrier may be properly aligned for further transportation on into the vat.

A second motor driven conveyor system 25 is located adjacent the output side of the fry vat and likewise includes a motor driven rolling mandrel 25a which drives a mesh or foraminous belt 25b, the entire structure being supported by the legs 25c at the optimum angle of inclination relative to the carrier transporting and conveyor means, discussed infra, so that the cooked food in the carrier may be deposited thereon.

Food to be french fried, is placed into a basket carrier 26. The carriers are rectangularly shaped in transverse section and are constructed of a rigid wire mesh which allows the heated liquid L in vat 20 to comingle with the food in a conventional french frying manner. Handle 26a is attached to the upper left-hand portion of each basket to aid in the handling and dispensing of the food product therewithin both prior to and after the cooking process.

A pair of rigid hook members 26b extend upwardly from open end of the carirer and are rigidly affixed to same with the open portion of the hooks facing rearwardly. The right-hand portion (see FIGS. 5, 6 and 7) of each carrier 26 has a programming plate 27 rigidly affixed thereto and substantially parallel to the lower portion of the hook structure 26b. The upper end of programming plate 27 is affixed to the hook structure 26b by a conventional nut and bolt combination 28 and spaced away from the outer side of carrier 26 by a cylindrical spacer member 29 (same being located between the plate 27 and the hook 26b). A lower nut and bolt combination 30 and associated spacer (not shown) likewise support and locate the lower end of the programming plate in a similar manner with respect to hook 26b so that a suitable space is left between the right side of each basket.

As more particularly seen in FIGS. 6 and 7, the programming plate has an elongated centered aperture 27a therein with a plurality of wider circular "cutouts" along the length thereof which represent different time intervals. A spring loaded timer knob 31 is movably located within elongated aperture 27a in order to set the time requirement for cooking the food product in carrier 26. The timer knob 31, is comprised of the cylindrical outer knob portion (having an inner bore of a preselected diameter) and a necked down circular aperture engaging portion 31a (having a smaller interior diameter bore). A flat-headed pin member 32 extends inwardly of the timer knob, there being a washer structure 32a on the inner end of the pin member and a flat rivet-like connection 32b on the outer end. A conventional compression spring 33 abuts the outer surface of the smaller diameter portion 31a and circumscribes pin member 32 within the larger diameter timer knob 31 but is limited at the outer end of the pin member by washer 32a.

The timer knob (31) may be vertically moved within the limits of aperture 27a of programming plate 27 by manually pulling out outwardly on timer knob 31, compressing spring 33 and freeing the necked down knob portion 31a from engagement within aperture 27a. The size of the slot, is such that the exposed pin member (32) may freely move to any selected position along the vertical aperture. When the appropriate time period is selected, the timer knob is released and the necked down portion is reinserted within the circular time position aperture at the appropriate place. As clearly seen in FIG. 7, the time may be set in .25-minute increments running from 1.25 to 4.50 minutes.

After the food has been deposited into a carrier 26, the carrier is then placed on the motor driven conveyor belt 23c which moves same to position A or the broken line position of carrier 26 as shown in FIG. 1. If position B (the first solid line position of carrier 26 moving from right to left) is not occupied, carrier 26 is moved thereto and the adjustable timer knob 31 on programming plate 27 raises a time setting lever arm 34 which extends from a timer mechanism, generally indicated by the numeral 35 discussed later. The time setting lever arm extends through a cover plate structure 36 which is fixedly supported relative to vat 20 and which separates the timer mechanism carrier conveyor and related circuitry from the above-mentionad belt conveyors and vat.

The raising of the time setting lever arm 34 initiates the operation of several associated mechanisms. For instance, the timer mechanism is appropriately positioned so that lever arm 34 is contacted and pivotally raised in accordance with the notch location of timer knob 31 in programming plate 27. Additionally, a microswitch 37 is located on the end extremity of time setting lever arm 34, same being of a conventional design which will be closed due to the above-mentioned movement of the lever arm. When microswitch 37 is closed, a reversible gear head motor 38 (see FIG. 3) is energized which, through a series of belt drives generally indicated by the numeral 39, may cause a triple roller chain conveyor 40 to move in either direction depending on the switching logic circuitry described, infra. The movement of the triple roller chain conveyor moves a carrier rod 41 (see FIG. 1) from the F position (the rods extending through a slot 36a in cover plate 36) to the B position allowing the carrier rods to engage hooks 26b, lift the carrier off of conveyor belt 23c and move same to position C which submerges the contents of carrier 26 within the liquid L of the vat. It should be pointed out that each of the rods 26 have selectively spaced collars 41a located thereon to contact the respective outside surfaces of hooks 41a thereby precluding the inadvertent sliding of the carriers when they depend from their respective rods. As suggested, above, the current from the microswitch 37 initiates the operation of the time and space control logic circuits which will be discussed, infra and which monitor the time and space requirements of each carrier as they are moved by conveyor 40.

When a carrier 26 is in position B, the presence of same will cause a microswitch (not shown but located behind the rolled lip 20a) to close thereby energizing a solenoid 142 so that its plunger will project therefrom contacting the next oncoming carrier (note the broken line position of carrier 26 in FIG. 1) and holding it in position A until position B is vacated. As will be seen with reference to FIG. 17a, solenoid 142 has microswitches 142a and 142b operatively associated therewith. For example, the closing of microswitch 142a causes the contracting of the armature of solenoid 142 thereby permitting carriers to enter position B. Microswitch 142b is located at position A which will close the illuminate light 142c thereby signalling the condition of position A.

Figure 3:
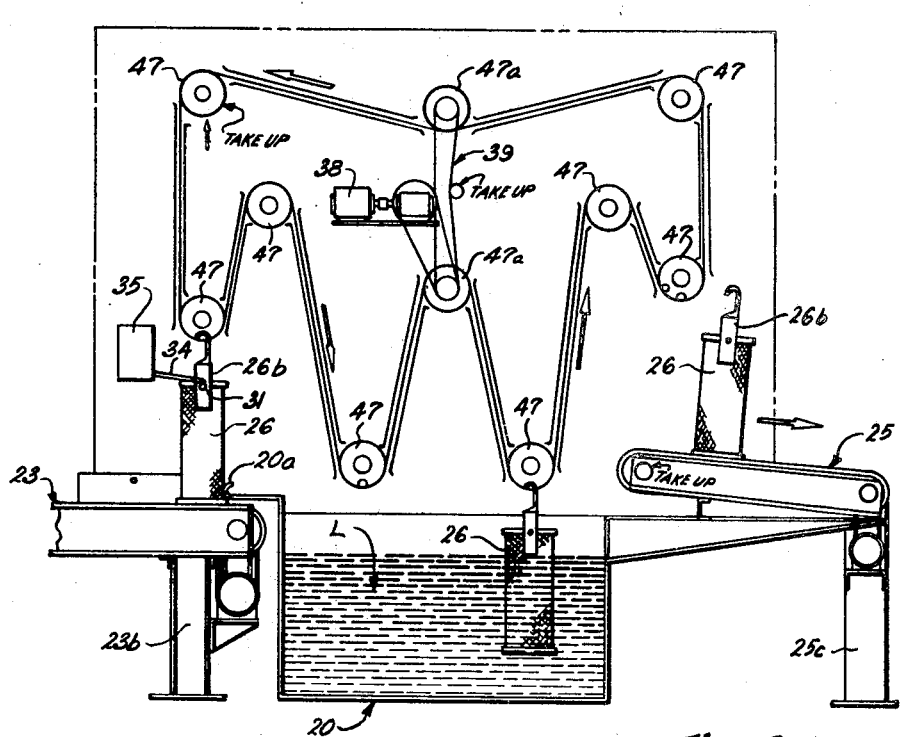
FIG. 3 is a schematic rear view of the conveying apparatus and frying vat shown in FIG. 1.
Figure 4:
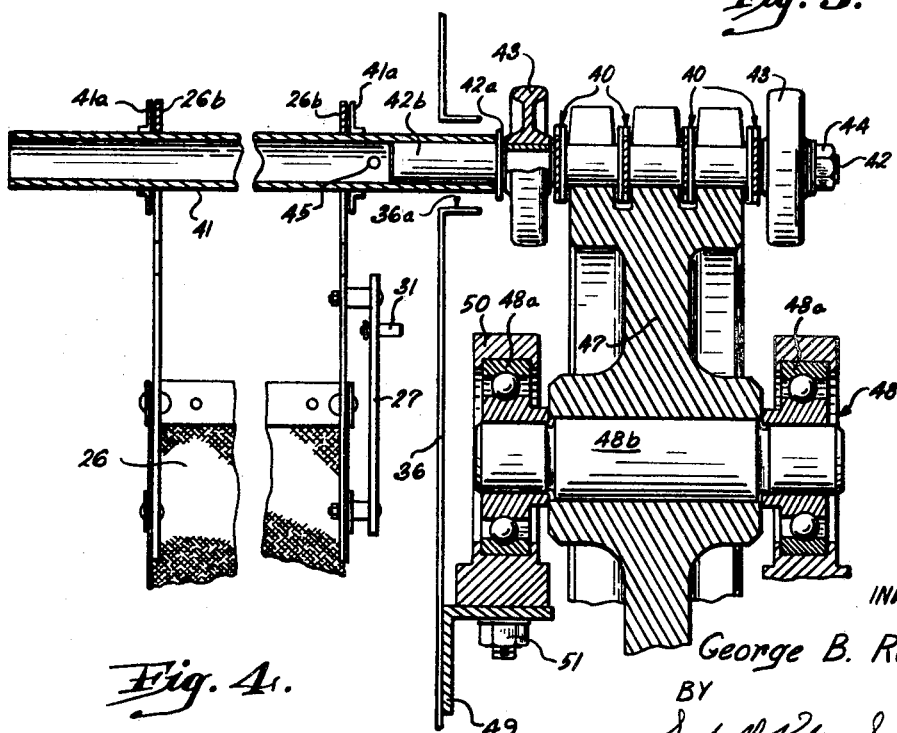
FIG. 4 is an enlarged partial sectional view of the triple roller chain conveyor and sprockets showing the carrier rod and associated basket carrier depending therefrom.

A more detailed showing of the triple roller chain conveyor may be had by reference to FIGS. 3, 4 and 5. As stated above, the roller chain conveyor moves behind the cover plate structure 36 with the chain portion being comprised of a three spacer wide bicycle type chain. A shaft member 42 extends outwardly from alternate outside chain links on each side thereof and supports properly bearinged roller wheels 43 thereon. Shafts 42 which extend rearwardly of cover plate 36 are exteriorly threaded so that nuts 44 may be affixed thereto thereby locking the rear roller wheels thereon. The forwardly extending roller wheel shafts have tight fitting collars 42a properly locating the roller wheels adjacent the rear side of cover plate 36. Selected ones of the forward shafts (42) have forward extensions 42b protruding through slot 36a in cover plates 36. The shaft extensions 42b are properly sized to facilitate the telescoping of the inner ends of carrier rods 41 on same and are of sufficient length and mass to support a loaded carrier thereon. When each rod is assembled, its inner end extremity abuts against the outer face of the washer collar 42a and may be fixedly attached thereto either at its forward end by a pin 45 or by a setscrew. As noted, only selected links of the chain have the shaft extension and associated carrier rods and these are located at exactly equal distances apart on the triple roller chain conveyor. As mentioned above, the carrier rods include the selective spacing of collars 41a thereover in order to restrict the sliding movement of the carrier hooks 26b when same are engaged and depended from the rod.

The slot 36a, in cover plate 36, is contoured to facilitate the proper positioning of a carrier at a proper time under the control and monitoring of the timer mechanism and logic switching circuit which will be described later. The roller chain conveyor movement is upon a channel iron framework track generally indicated by the numeral 46. This track follows the contour of slot 36a and provides a surface for roller wheels 43 to glide thereon.

The roller chain conveyor is propelled by and rotated on the triple circuit sprockets 47 which are shown in detail in FIG. 4. These sprockets are mounted on bearings 48 which may be supported from and bolted to an associated angle iron bracket generally indicated by the numeral 49. (In FIG 4 the bearing mount 50 is shown bolted at 51 to angle frame 49.). The mount substantially encloses the bearing race 48a which circumscribes each end of shaft 48b. Sprocket 47 with its central bore is fixedly attached to the central portion of shaft 48b in a conventional manner. As shown in FIG. 3, the motor belt drive 39 may directly drive sprocket 47a in a conventional manner with the other sprockets being essentially free wheeling. Also, in the closed loop, the sprocket in the upper left-hand corner of FIG. 3 acts as a takeup sprocket assuring the proper tension on the roller chain conveyor.

The reversible gear head motor 38 (FIG. 3) starts when an incoming carrier which has been cleared by the "time and the space control monitoring circuit," enters into the vat or when a carrier is being removed from the vat. Motor 38 is stopped when the next passing carrier rod 41 (moving in the forward direction), lifts the closing arm 50a of microswitch 50 (FIG. 8) and causes a later described latching relay to deenergize conveyor motor 38 and to stop the conveyor. Microswitch 51 and its associated closing arm 51a performs the same function (as microswitch 50) when the motor has been operating in the reverse direction.

A brief review of the structural orientation of the vat and conveying systems indicate that there are six (6) position. These positions are; (1) position A where carrier 26 is held until position B is unoccupied; (2) position B where hooks 26b of carrier 26 are engaged by a carrier rod 41 and conveyed to the first vat section; (3) position C or the first vat section; (4) position D or the second vat section to which a carrier in position C is moved when another carrier enters position C or when a carrier that was in position D has completed its cooking time and was removed from the vat position E; (5) position E where the carrier is placed on a sloping lower conveyor belt 25b and where the carrier hooks 26b are disengaged from the carrier rod 41; and (6) position F which designates a position where the forward acting microswitch 50 and reverse acting microswitch 51 are placed behind cover 36 (see FIGS. 1, 3 and 8).

It is important to note that the distance between each of the positions that is the distance between positions B to C—C to D—D to E—E to F— and F to B are exactly the same and that the five carrier rods 42 are spaced on conveyor chain 40 to stop at the location (there may be a slight overrun, however, some may be calibrated into the switching) of each of the five positions. As may be seen in FIG. 17a, a double pole double throw relay (nonlatching) 138 directs the 110-volt AC potential to motor 38, however it should be noted that the lower contacts thereof will direct 12-volt DC to the motor to stop "overrun" of same. In this manner, the carriers will be made to always stop exactly at the correct position.

An accessory to the roller chain conveyor is the addition of the plurality of spring clips 52 which are fixed to cover plate 36 and extend outwardly therefrom. These clips releasably contact the carrier rods 41 and cause carrier 26 to sway from side to side. This creates a rocking action within the carrier and shakes the contents of the carrier to loosen any particles that may have been frozen together or adhere to each other during processing.

As discussed above, timer mechanism 35 is located on the rear side of cover 36 and has the time setting lever arm 34 (and associated microswitch 37) extending forwardly of cover plate 36 into the path of timer knobs 31 as they move along the conveyor line. The timer mechanism includes a timer wheel 53 and a time setting wheel 54 which are constructed of a nonmagnetic material such as polyethylene, Teflon or the like and which will be described in more detail later. The closing of the master switch energizes a timer motor 55 and causes timer wheel 53 to be rotated through the gear train shown in FIGS. 9 and 10. The timer motor has a shaft 55a which rotates at a rate of ½ r.p.m. and which has a spur gear 56 fixedly mounted thereon and meshing with a lagrer gear 57 that is fixedly secured to timer wheel 53. Both timer wheel 53 and time setting wheel 54 are supported on shaft 58c which extends through the timer mechanism casing but which is fixedly attached only to time setting wheel 54. In this manner, timer wheel 53 is permitted to be freely rotated on shaft 58c by timer motor 55 and is not affected by the rotative disposition of shaft 58c. Various means may be used to reset the timer wheel to its zero or starting position. In this regard, a conventional tension spring (not shown) may be used to return the wheel in a screen door fashion.

Figure 9:
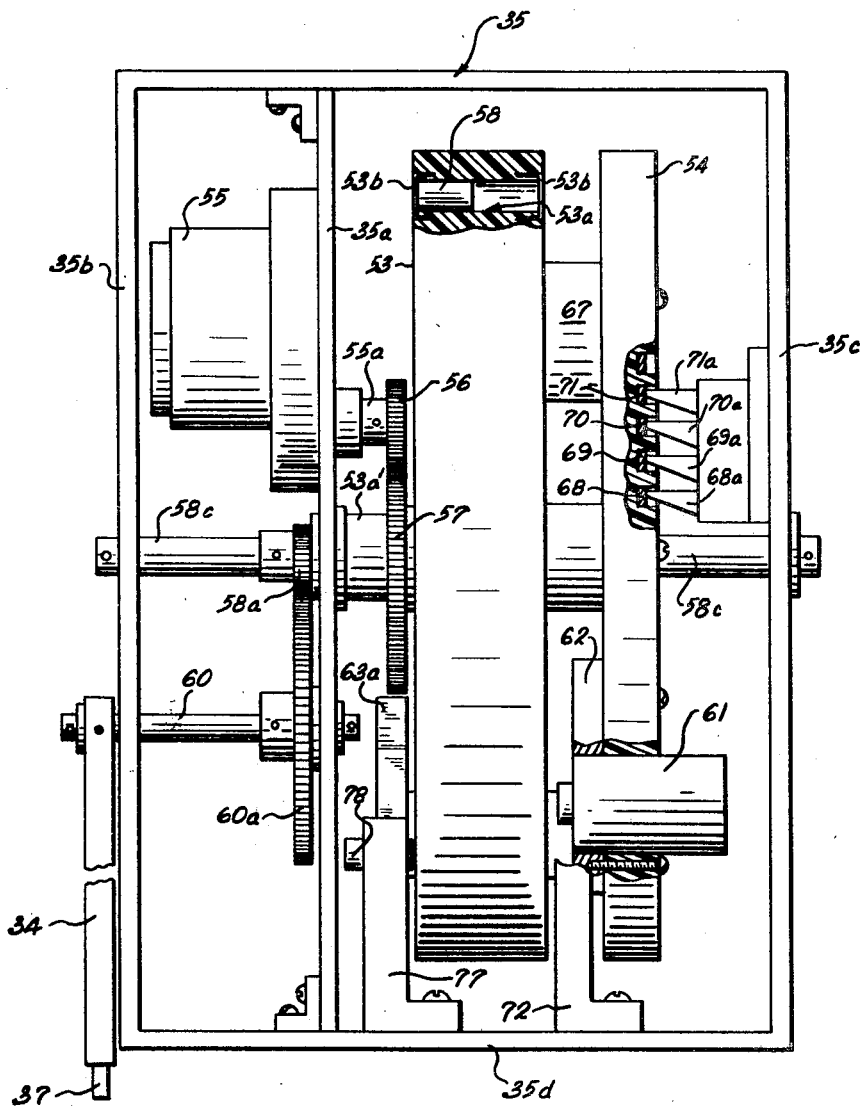
FIG. 9 is a side elevational view of the timer unit with a portion broken away to show the movable magnets utilized therewith.
Figure 10:
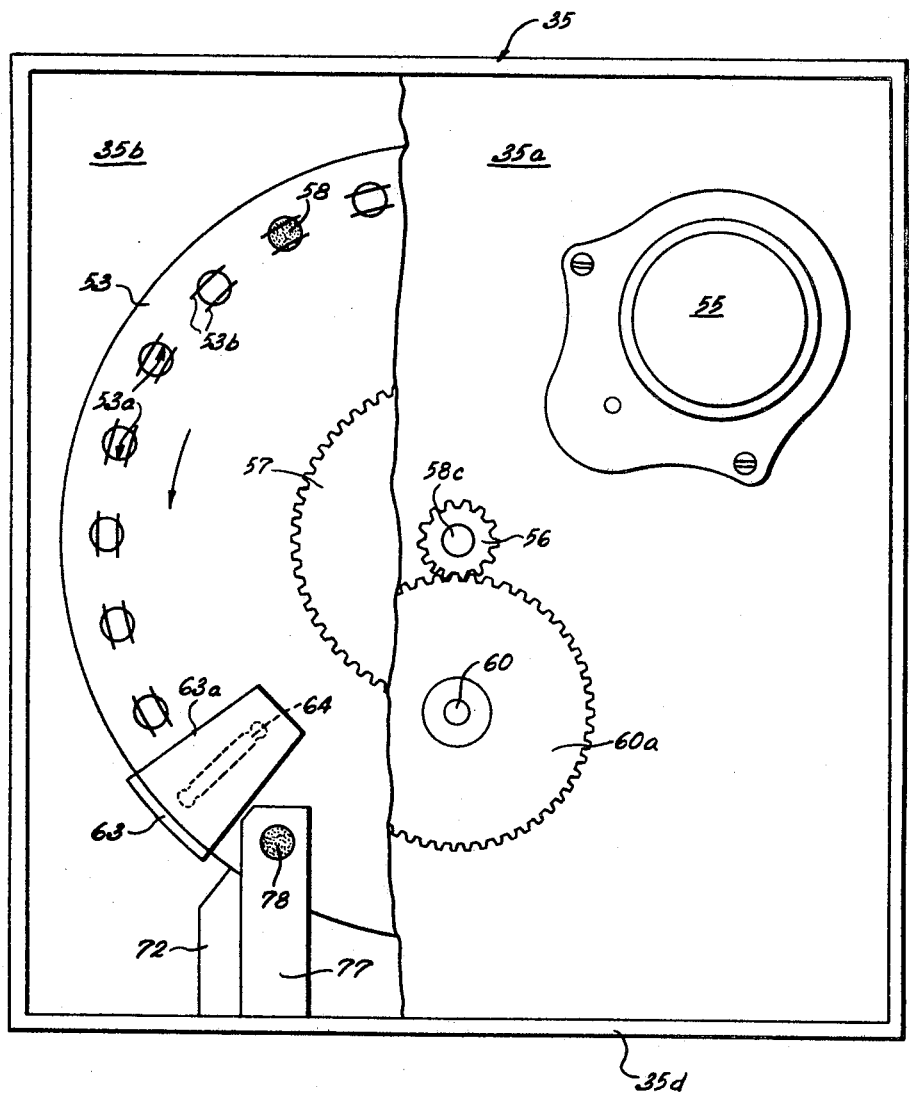
FIG. 10 is a front elevational view of the timer unit with portions broken away to show the timer wheel and related elements.
Figure 11:
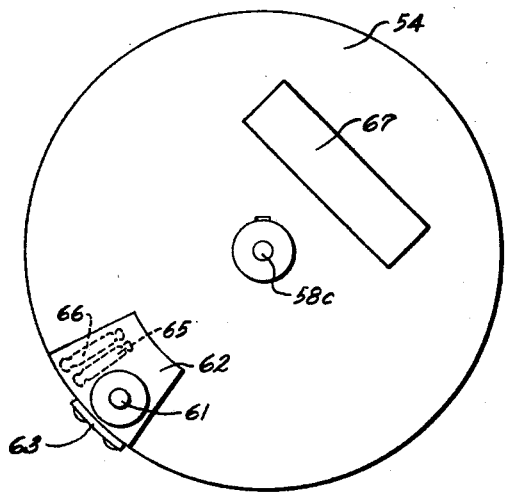
FIG. 11 is a front elevational view of the time setting wheel and related elements.
Figure 12:
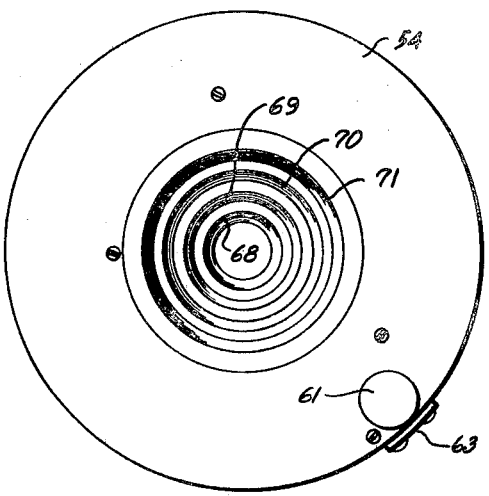
FIG. 12 is a rear elevational view of the time setting wheel shown in FIG. 11.
Figure 13:
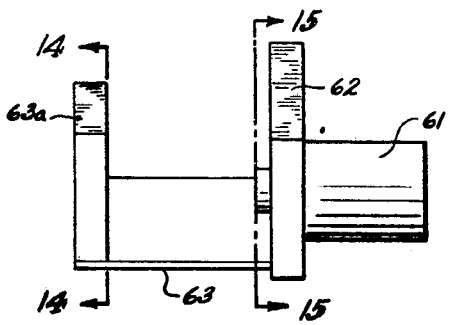
FIG. 13 is an elevational view of the combination electromagnet and reed switch holding bracket.
Figure 14:
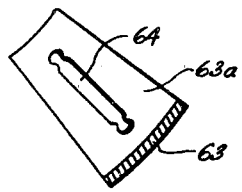
FIG. 14 is a sectional view taken generally along the line 14—14 in FIG. 13 in the direction of the arrows.
Figure 15:
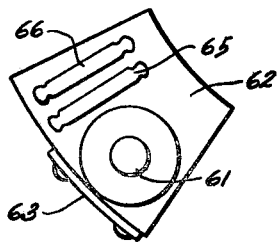
FIG. 15 is a sectional view generally taken along the line 15—15 in FIG. 13 in the direction of the arrows.
Figure 16:
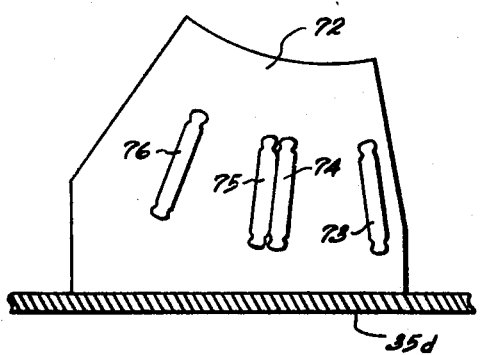
FIG. 16 is a front elevational view of the bracket contained within the timer unit and holding the four (4) reed switches illustrated therein.

As seen in FIGS. 9 and 10, the outer peripheral edge portion of timer wheel 53 contains a plurality of equally spaced apertures 53a. These apertures contain permanent magnets 58 which are slightly less than ½ the length of cylindrical apertures 53a and are of a selected diameter so that they may slide from one side to another when attracted by a magnetic force exerted from either side of the timer wheel 53. Small gauge iron wire 53b is positioned across the open end of each aperture and on each side of timer wheel 53 so that it may serve as a magnetic attraction to hold the magnets to the side of the wheel to which same was last attracted. This prevents the uncontrolled movement of the magnets caused by magnetic fields of the adjoining magnets and other influencing factors.

The timer motor 55 and the timer wheel-time setting wheel combination are compartmentalized and separated by conventionally mounted and appropriately apertured wall 35a. To properly and rotatively mount timer wheel 53 on shaft 58c, an integrally formed sleeve 53a' extends forwardly of a timer wheel 53 and abuts the rear surface of plate 35a thereby permitting the wheel 53 to be freely rotated on the shaft but optimally positioned relative gear 56 and its alignment with gear 57.

The time setting wheel is likewise formed of a nonmagnetic material such as that mentioned above, however, this wheel is attached to and rotates with shaft 58c by set screws (not shown) or any other conventional means. The angular position of time setting wheel 54 with respect to timer wheel 53 is initially determined by the movement of lever arm 34 which is lifted by adjustable timer knob 31. In this regard, lever arm 34 is fixedly attached to the outer end portion of shaft 60, same being mounted between the forward casing plate 35b and inner plate 35a. The rearward end portion of shaft 60 has gear 60a fixedly located thereon and rotatable with any angular movement of shaft 60. Gear 60a meshes with gear 58a which is likewise fixedly connected to shaft 58c. Accordingly, the upward pivotal movement of lever arm 34 is translated via the shaft and gear train described immediately above to time setting wheel 54.

As seen in FIGS. 9 and 11–13, an electromagnet 61 extends through suitable opening in time setting wheel 54 and is further fixedly held in place by bracket 62. (Bracket 62 being attached by brass screws to the forward face of wheel 54.) Electromagnet 61 has its left end extremity (FIG. 9) rotating in an orbital path which is spaced apart but coincident with the location of the permanent magnets 58 in timer wheel 53. A flanged bracket 63 is bolted to the outer peripheral surface of bracket 62 and extends to the left, as seen in FIG. 9, over the peripheral edge of timer wheel 53 and is then extended toward the center of 53 by the flange portion 63a. Bracket flange 63a contains a single pole single throw-normally open reed switch 64 which occupies the same position on the left (as seen in FIG. 9) or on the opposite side of timer wheel 53 from electromagnet 61. The magnetic force of a permanent magnet 58 in the left (or as will be referred to as the unset position) of timing wheel 53 will close reed switch 64 when aligned therewith. As will be described infra, the logic switching circuit is designed so that electromagnet 61 cannot be energized until it is aligned with the permanent magnet 58 that will be set to time the incoming carrier. As a result, reed switch 64 is closed since it is positioned to align in the same aperture area of timer wheel 53 as will electromagnet 61. The closing of reed switch 64 results in a 12-volt DC line being connected through a series of control relays (discussed later) to electromagnet 61. Since reed switch 64 and electromagnet 61 are aligned, the shifting of the proper permanent magnet 58 to the right side of timer wheel 53 (FIG. 9) is insured upon the energization of electromagnet 61.

Bracket 62 (which is attached to time setting wheel 54 and which holds electromagnet 61 as described above), also holds two single pole single throw-normally open reed switches 65 and 66 which align with set permanent magnets 58, that is when magnets occupy the right (or time set) side of their respective apertures 53a in timer wheel 53 (see FIG. 9).

When reed switch 65 is closed by a passing permanent magnet that has been shifted to the set position as decribed above, it completes a circuit which includes the operating coil of a latching relay generally indicated by numeral 67 and when reed switch 66 is then sequentially closed by the passing magnet in the same set position, the operating coil of the latching relay 67 is energized. As described above, reed switches 65 and 66 are attached to the inner surface of the time setting wheel 54 as is the latching relay 67 and are physically arranged so that they monitor the timing of the next incoming carrier 26. This will be described in more detail in conjunction with the logic switching circuit shown in FIGS. 17a and 17b. To accommodate the presence of the latching relay 67, the timer wheel 53 may contain a recessed area located between the apertures 53a and the central bore of same.

The right or outer surface of time setting wheel 54 (see FIGS. 9 and 12) contain four circular concentric ring contacts 68, 69, 70 and 71. The brush terminals 68a through 71a (FIG. 9) make continuous contact with these ring contracts and are fixedly supported from the right-hand casing 35c of the timer mechanism. Brush terminals 71a and 70a, transmit a 12-volt DC potential to electromagnet 61 and latching relay 67. The other two ring contacts 68 and 69 and their respective brushes 68a and 69a, are used to supply energy for other control circuits described infra.

A bracket 72 is affixed to base 35d of the timer mechanism housing in a conventional manner and contains four single poles single throw-normally open reed switches generally indicated by the numerals 73, 74, 75 and 76 which will close when aligned with a permanent magnet 58 that has been shifted to the right or time set position in timer wheel 53. Reed switch 73 is closed by a passing "set" magnet approximately ten seconds before the completion of the carrier's time cycle. Current from switch 73 is used to activate a relay circuit in the switching section which prevents the conveyor 40 from reversing during the time shortly before and during the time the carrier is being removed from the vat. Reed switch 74 is closed upon the cmpletion of the carrier's time cycle and connects a 12-volt DC potential to the logic switching circuit energizing a relay which will start motor 38 to remove the carrier from the vat, however, this relay is limited in its response to those instances where one carrier had entered the vat and has remained in the first vat position (position C) throughout its entire cooking cycle because of the absence of an oncoming carrier to cause the cooking carrier to move to the second vat position (position D). When the set permanent magnet corresponding to the carrier's time cycle in the vat reaches reed switch 75, the movement of conveyor 40 will move carrier 26 from the first vat section (position C) to the second vat section (position D). Since the carrier has completed its time cycle it should be promptly removed from the vat and the closing of reed switch 76 accomplishes this by energizing the same motor relay mentioned above thereby causing conveyor 40 to move the carrier from the vat. The logic switching circuit shown in FIGS. 17a and 17b shows the circuitry to control the above functions.

A bracket 77 is mounted to the left of and at the lower portion relative to timer wheel 53. This bracket contains a permanent magnet 78 which is located in close proximity to the orbiting path of apertures 53a and timer wheel 53. This magnet (permanent magnet 78) operates to attract all magnets 58 that have been shifted to the right or time set side of wheel 53 back to the left or neutral side after the completion of the timing cycle.

Figure 17A:
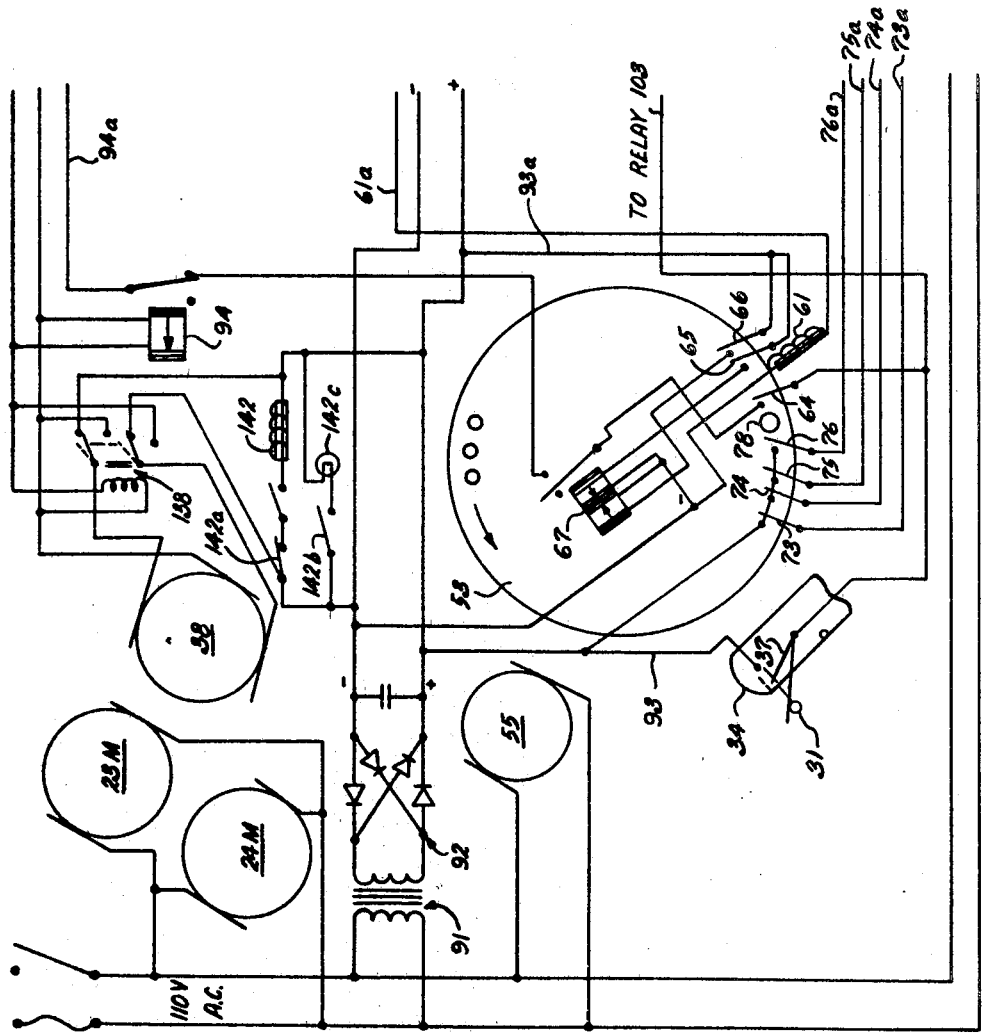
FIG. 17a is the left hand portion of the schematic circuit diagram which shows the circuitry monitoring the movement of the carrier relative to the frying vat.

Turning now more particularly to the logic switching circuitry which is basically disclosed in FIGS. 17a and 17b, this circuitry operates in conjunction with the timer mechanism to control the movement of a carrier through its cooking cycle. The typical type of relay utilized in the circuitry is shown in FIG. 17c and has either one or two coils associated therewith. When a particular coil is energized, the relay arm moves to a contact closed position, either to the right or to the left, depending upon the direction that the arrow is pointing for the particular energized coil. In the case where a single relay coil is shown with the relay, the relay arm moves from an open position to a closed contact position in the direction indicated by the arrow on the energized coil.

The main source of power for the logic switching circuitry comes from a conventional 110-volt AC outlet as disclosed in FIG. 17a. A conventional step down transformer 91 and rectifier bridge 92 reduce and change the 110-volt AC to 12-volt DC having a polarity shown therein. Conventional motors 23M and 24M may be driven directly from the 110-volt AC source to provide the motive power for belt conveyor systems 23 and 24. Conveyor motor 38 is likewise energized from a 110-volt AC source through relay contacts associated with relay 138. It should again be pointed out that the double pole double throw relay 138 is wired so that when the 110-v circuit is applied to one phase of the two phase motor, the 12-volt circuit is disconnected. When the 110-volt circuit is broken, the 12-volt DC potential is applied to the second phase thereby causing a breaking action on motor 38. Timer motor 55 also is powered by the 110-volt AC source.

The positive side of the 12-volt rectifier bridge is connected to one side of the normally open contacts of microswitch 37 via line 93. When the timer knob 31 of each carrier 26 advances into position B and raises lever arm 34, the contacts within the microswitch eventually close thereby connecting the positive potential through the microswitch to one side of reed switch 64. As mentioned above, reed switch 64 will close when aligned with a permanent magnet 58 which is in the left or neutral side of timer wheel 53. The closing of reed switch 64 completes a circuit to the arm of latching relay 67 and may continue on through the arm of relay 94 (when in the position as shown in FIG. 17a) to the left contact of the single pole single throw-normally open reed switch (or relay) 95 via line 94a. (As will be seen, relay 94 operates to interrupt the flow of curent to a later described relay 95 when motor 38 is operating.)

The 12-volt potential is likewise applied to the single pole single throw-normally open reed switches 65 and 66 via line 93a. Current flows through the above described circuit to the arm of relay 95 which is monitored by the sequential action of these two reed switches (65 and 66). For example, the closing of reed switch 66 due to the magnetic attraction of a passing permanent magnet 58 in the right or time set side of timing wheel 53 results in the closing of the latching relay 67 (the movement of the arm of relay 67 to the right-hand contact associated therewith) while the closing of reed switch 65 opens the circuit associated with the arm of relay 67.

The rotation of time setting wheel 54 due to the corresponding position setting of timer knob 31 on programming plate 27 may cause reed switches 65 and 66 to encounter a passing permanent magnet 58 which has been shifted to set the time cycle of the preceding carrier. Since an entering carrier cannot be timed to complete its cycle before the previous carrier is removed from vat 20, reed switch 65, upon approaching a previously set magnet, latches the arm of relay 67 to the open circuit position so that the current flow to the arm of relay 95 is interrupted. Likewise, reed switch 66 when closed by the attraction of the passing permanent magnet, latches the arm of relay 67 to the right contact thereby closing the circuit and permitting the current flow from switch 64, to the arm of relay 95.

The entering carrier will therefore, be held in position B until the remaining time cycle of the previous carrier is approximately eight (8) seconds longer than the time cycle of the entering carrier. Remember that timer wheel 53 rotates counter-clockwise (FIG. 18) at a rate of ⅛ r.p.m. Also note that the arm of relay 67 will normally be in the closed circuit position since the magnet shifted by the entering carrier will attract reed switch 66 after switch 65 when the time setting wheel 54 rotates back to its normal position. Accordingly, the time control section of this circuit operates so that when current flows to the arm of relay 95, it is; (1) an indication that electromagnet 61 has been rotated to a position on timer wheel 53 corresponding to the time set by timer knob 31; (2) that it is in alignment with a permanent magnet 58 in the timer wheel (by reason of the alignment of switch 64 with a neutral magnet); and (3) that the time setting of the entering carrier will not interfere with the timing of the carrier that previously entered into the vat's section. The actual shifting of the permanent magnet 58 to set the time of the entering carrier will occur after the "carrier space lockout circuit" has allowed the necessary negative potential to be applied to the coil of relay 95 and the arm associated therewith to close or move to the left contact as shown in FIG. 17b.

As suggested above, the arm of relay 95 closes when negative potential is applied thereto in an appropriate manner thereby closing the circuit to its coil. When the arm of single pole double throw latching relay 96 is shifted to the left contact as seen in FIG. 17b, lines 95a and 96a complete the circuit to relay 95. The sequential operation of the circuitry is such that the arm of relay 95 will be closed with its left contact upon the energizing of its coils until both sections of the vat section are occupied. At this time, relay 96 will have its left coil energized, shifting its arm to the right contact and opening the circuit to relay 95. As a result, the arm of relay 95 is shifted to its right or open circuit condition where it will remain until the space again becomes available within vat 20.

The positive potential at the closed arm of relay 95 (due to a space available condition) causes current to flow to the arm of a single pole single throw reed switch or relay 97 which is schematically indicated as having its arm closed with the left contact associated therewith. A circuit path is therefore completed which includes lines 97a and 98a, the left contact of a single pole single throw reed switch or relay 98, the relay arm contacting same, and from thence on to the right-hand or closing coil of a double pole, double throw latching relay 99 via line 99a. The DPDT relay 99 is utilized to energize conveyor motor 38 by connecting same across the 110-volt AC source. Secondly, the circuit path to electromagnet 61 (which will attract the permanent magnet 58 to be set in timer wheel 53 thereby setting the time cycle of the entering carrier) is completed via lines 97a and 61a. Finally, the left coils of relays 96 and 100 have a positive potential applied thereto via lines 97a, 96b, and 97a to 100a, respectively. The relays 96 and 100 accordingly monitor the available vat space and "lockout" the carriers in the event an appropriate vat space is not available.

With respect to the energization of relay 96, it should be noted that the arm of same will not shift from the left to the right contact at the time mentioned immediately above because the negative side of the left coil of relay 96 is open circuited until microswitch 50 energizes the left coil of relay 101 via lines 50a, 99b, and 101a. Once the above-mentioned microswitch circuit is completed to the left coil of relay 101, the arm thereof will be shifted to its right contact completing the circuit to the left coil of relay 96 thereby allowing the arm of the relay to move to its right contact. This switching event, however, will not occur until after the carrier has left position B and has been conveyed into position C and with the conveyor 40 stopped. Microswitch 37 will then be opened and the arm of relay 96 will not react at this time, however, the left-hand coil of relay 96 will now have a negative potential applied thereto from the negative side of the rectifier bridge, through the arm of relay 101, the right contact thereof and line 101b. The entry of the next carrier will then cause the left coil circuit to become completed and the relay 96 to react thusly shifting its arm to its right contact. Accordingly, the coil of relay 95 is deenergized (having been open circuited by the shifting of the arm of relay 96) and its associated arm moved to the right contact thereby opening its related circuit until space becomes available in the vat by the removal of a carrier.

In a similar manner, the left coil of relay 100 will be caused to react (having both a negative and a positive potential applied across same) to shift the arm thereof to its right contact. The arm of relay 101 and the right contact thereof (via line 101b) energizes the left coil of relay 96 so that the relay is in condition to react when the second carrier enters position B.

The right coil of double pole double throw latching relay 99 moves both arms to their respective left contacts thereby connecting conveyor motor 38 across the 110-volt AC line so that conveyor 40 will move the carrier from position B to position C. When the conveyor has moved the exact distance to the next station, the next carrier rod 41 contacts the closing arm of microswitch 50, closes same and energizes the left coil of relay 99 shifting the associated arms to their respective right contacts, open circuiting motor 38 and thereby stopping the conveyor 40. The microswitch 50, via lines 50a, 99b, and 101a energize the left-hand coil of relay 101 causing its arm to shift to the right contact thereby so that the left coil of relay 96, by way of line 101b, is conditioned to react upon the entry of the second carrier.

The entry of the second carirer will repeat the functions discussed above except that the arms of relays 100 and 101 will not shift to the right contacts as they already occupy this position, however, the arm of relay 96 will shift to its right contact causing the following to happen:

(1) A negative potential is applied to the left coil of relay 102 via 102a thereby causing the arm of relay 102 to shift to its right contact; and (2) The left coil of relay 103 will then be energized via line 103a causing the arm of this latching relay to shift to its right contact. This single pole double throw latching relay (103) is part of a switching circuit which is utilized to reverse the position of the carrier and will be discussed in more detail infra.

A review of the switching circuits described immediately above indicates that the four relays 96, 100, 101, and 102 monitor the spaces available in the vat sections. When one space is occupied, the arms of relays 100 and 101 will have shifted to their right contacts and when both spaces are occupied the arms of all four relays will have shifted to the right contacts. It should also be noted that the number of vat spaces may be increased and monitored by placing one additional single pole single throw latching relay in the circuit between relays 101 and 102 and one additional relay between relays 96 and 100 with an appropriate extension of the circuit for each additional space to be added.

When both vat spaces are occupied and another carrier with contents ready for cooking, enters position B, whose time cycle is set for less than the remaining time on the preceding carrier, the timing circuits will cause current flow to the arm of relay 95. This relay arm is, however, now open circuited thereby precluding any further energization of the switching circuits. The carrier will remain in position B until one of the carriers now in the vat has been removed therefrom. At this time, the arm of relay 95 will again close and allow the carrier in position B to enter position C in the vat.

CIRCUITRY MONITORING THE REMOVAL OF CARRIERS FROM VAT 20 AND THE CONTROL OF THE VAT SPACES

As discussed above, timer wheel 53 is rotated in a counterclockwise direction by timer motor 55 thereby orbiting the permanent magnet 58 from the position where it was set by electromagnet 61 on the time setting wheel 54 to the completion of the cooking cycle related to that particular permanent magnet. As the completion of the cooking cycle approaches, the set permanent magnet comes into switching proximity with the four single pole single throw-normally open reed switches 73–76 which are affixed to bracket 72 as described above. The magnetic field emanating from the approaching set permanent magnet will close each of these reed switches in the order that they are positioned. The first reed switch to be aligned with the passing permanent magnet, reed switch 73, closes and energizes the right coil of relay 104 via line 73a. The current flow to this coil of the single pole double throw-normally closed latching relay opens the circuit (moves the arm to the left contact) to cut off the flow of current to the coil of relay 97 by the line 97b and prevents the arm of relay 97 from energizing the right coil of the double pole double throw relay 105 by way of the line 105a. Accordingly, motor 38 is prevented from operating in the reverse direction so that conveyor 40 may not reverse for a period of approximately 10 seconds before each carrier is removed from the vat and until after the carrier has been removed and the forward motion of the conveyor motor (38) has stopped.

The next sequentially positioned reed switch (74) when aligned and closed by the set permanent magnet, energizes the right coil of relay 100 via line 74a and the right coil of relay 96 via line 74b. The arm of relay 96 is then conditioned to shift to its left contact as the arm of relay 100 contacts its right contact. To further insure the above condition, the arm of relay 100 will not shift to its left contact as the negative side of its right coil is open circuited until the arm of relay 102 shifts to the left. This, of course, will occur when microswitch 50 closes, stopping conveyor motor 38 and energizing (applying a positive potential thereto) the right coil of relay 102. By that time, the reed switch 74 will be opened because the permanent magnet will have been rotated past its attraction range, however, the right coil of relay 100 will have the appropriate negative potential applied thereto when the arm of relay 102 has shifted to its left contact. When the permanent magnet set for the next carrier reaches and closes reed switch 74, the arm of relay 100 will shift to the left contact while the arm of relay 96 remains in its position at its left contact.

Reed switch 75 is the next to be aligned with and closed by the set permanent magnet. This reed switch thereby energizes the coil of relay 98 via lines 75a, 75b, and 98a causing its arm to close on the right contact thereof. The right coil of relay 99 will then be energized by way of line 99a causing the associated double throw relay arms to move to their associated left contacts, start motor 38, and cause conveyor 40 to remove the carrier from vat 20. Microswitch 50, via lines 50a and 99b energizes the left coil of relay 99 thereby opening the above-mentioned contacts and stopping the motor upon completion of its limited conveyor run. Microswitch 50 also energizes the left coil of relay 101 via 101a, the right coil of relay 102 via lines 50b and 102b, and the left coil of relay 104 via lines 50b and 104a.

It has been shown that carriers 26 enter and leave cooking vat 20 by the same conveyor line. Therefore, since the logic monitoring the control of the vat spaces for incoming and outgoing carriers is different and separate, the actuating of the motor control relay (relay 99) for the outgoing carrier is isolated by the single pole double throw relay 98 and its associated arm which separately switches its related circuit to prevent the energization of the above-mentioned space monitoring relays.

The latching relays (also space monitoring relays 96, 100, 101 and 102 have now shifted their respective arms through the following cycles (1) when a carrier entered the vat; (2) when a second carrier entered the vat; and (3) when the first carrier had completed its cooking cycle and was removed from the vat. The condition described by the last mentioned cycle leaves one space in the vat, position C, unoccupied and if another carrier entered at this point the forward movement of conveyor 40 would remove the carrier now in that position D from the vat. Accordingly, the present conditions would indicate that an incoming carrier must wait until the carrier in position D is finished cooking so that the forward movement of the conveyor will remove the carrier from position D and move the incoming carrier into position C, both functions being simultaneously accomplished with the same movement of the conveyor. I have found, that in order to efficiently utilize all the space in the cooking vats, the logic circuitry must be constructed so that under the particular condition mentioned immediately above (where a carrier is in that position D and another carrier is in position B ready for entry into the vat), the logic switching circuit will detect this condition and cause the double pole double throw latching relay 105 to reverse conveyor motor 38 when current from the time control circuit passes through the arm of relay 95 to the arm of the single pole double throw relay 97 (same being located on the right contact thereof) and is directed via line 105a to the right coil of relay 105.

From the above discussion, it will be apparent that a single carrier may be located in position D only after two carriers were in the vat with one having been removed. This condition is identified in the sequence of the carrier movements as indicated by the various conditions of the single pole double throw latching relay 103. As stated above, when all of the positions are occupied, the latching relays 96, 100, 101 and 102 have respective arms shifted to the right contacts. The right contact of relay 102 causes the left coil of relay 103 to be energized via line 103a and its arm to shift and latch to its right contact only when both vat spaces are occupied. When one carrier is removed from the vat and the arm of relay 103 is interconnected with the left contact of relay 102 via lines 102c and 102d, current will flow to the coil of relay 97 via line 97b and through the closed right-hand contact of relay 104. Accordingly, the arm of relay 97 is closed and made ready by an incoming carrier to energize the right coil of reversing relay 105 to reverse conveyor motor 38.

The above sequence of events, will cause the carrier in position D to be reversed so that the carrier rod 41 raises the closing arm of the double pole single throw microswitch 51 thereby stopping the reverse movement of motor 38 and the chain conveyor 40 so that the carrier locates in vat position C. Microswitch 51 also causes the right coil of relay 104 to be energized thereby shifting its associated arm to the left contact. This in turn opens the circuits of the coil of relay 97 thereby shifting its associated arm to the left contact. The arm of relay 97 being now located on its left contact completes the circuit comprising the lines 97a, 98a, the arm of relay 98, and line 99a to energize the right coil of relay 99 thereby closing its associated relay arms, connecting conveyor motor 38 across the line so that conveyor 40 will move in a forward direction. The carrier previously held in position B will now enter the vat (in position C) and the carrier previously reversed to position C will move to position D with the same forward movement of the carrier conveyor.

The sequence of the energization of the coil of relay 97 by way of the right contact and relay arm of relay 104, occurs only when one carrier is in the vat and in position D. There are, however, frequent instances when there may be no incoming carrier in position B ready for entry into vat 20. In these instances, the carrier in position D is not moved back to position C but finishes cooking and is removed from the vat in accordance with the circuitry associated with reed switch 75. Motor 38 will not reverse, microswitch 51 will not be closed (no reverse movement of a carrier rod) nor will the coil of relay 97 be open circuited by the shifting of the arm of relay 104 to the left. Since the vat will now be empty, the shifting of the arm of relay 103 to its left contact (causing relay 97 to energize relay 99 to move the conveyor in a forward direction) is accomplished by the energy from microswitch 37 as the next carrier enters position B.

The switching circuitry also includes a means for precluding the reversal of conveyor 40. This becomes important when a carrier in position D is within a few seconds of finishing its time cycle and should be removed from the vat by the forward movement of conveyor 40. Reversing the carrier from position D to position C at this particular time would not increase in the efficiency of the vat space utilization. Single pole double throw normally closed latching relay 104 monitors this situation and upon the reception of a signal from reed switch 73, this relay shifts its arm to the left contact. Accordingly, the circuit to the coil of relay 97 is opened and the motor reversing relay 105 is precluded from being energized to instigate the reverse movement of conveyor 40. The arm of the latching relay 104 is at all other times latched to its right contact by the circuit from microswitch 50 upon the completion of each forward movement of the conveyor 40.

As mentioned above, when the arm of relay 103 is contacting its right contact it is an indication that either:

(1) Two carriers are in the vat section in position C and D; or (2) That there is one carrier in the vat section in position D.

It therefore follows that when the arm of relay 103 contacts its left contact, that either:

(1) No carriers are in the vat sections; or (2) That there is one carrier in the vat in position C.

Any of the other possible situations would have the outgoing carrier in position D by the movement of either a following incoming carrier or a preceding outgoing carrier.

A push button 106 is disposed within the switching circuitry for the purposes of bypassing the outgoing controls and removing a carrier whenever desired. For example, when push button 106 (FIG. 17b) is depressed, the positive potential is connected to relay 98 via lines 106a, 75b and 98a. This operates to energize the coil of relay 98, shifting its arm to the right contact thereof. Likewise, the circuit to the right coil of relay 99 (via line 99a) will be closed, shifting its associated contacts to the left which energizes motor 38 so that carrier 26 may be removed when desired.

Relay 107 is also interconnected with relay 98 and is utilized in conjunction with reed switch 76 for removing a carrier from the vat position C when there are slack periods with an absence of other carriers either ahead of or behind this particular carrier. As a result, relay 107 will cause the carrier to move forward on to the sloping output conveyor belt (position E) which is essentially a two position jump. For example, the movement of timer wheel 53 is such that the set permanent magnet 58 eventually closes reed switch 76, thereby applying a positive potential to the arm of relay 107 by way of the line 76a. As long as the right coil of relay 103 is energized so that its arm is shifted to the left contact thereof, relay 107 will have its coil energized shifting its arm to its left contact. Accordingly, relay 98 is energized via lines 76a, 98a and the arm of relay 107. The motor relay 99 will then cause the conveyor motor to move the carrier out of the vat and to continue running until shut off by microswitch 50 as described above.

As shown in FIG. 17c, a reset switch RS is associated with the circuitry for the purpose of clearing same. This switch is essentially a double pole, double throw push button which is properly isolated by the four (4) poled diodes connected thereto. If, for example, the carriers have been mishandled or other interference has upset the movement sequence, it is sometimes desirable to clear the program relays to a starting position. The depressing of switch RS moves the arms of the associated relays to their neutral positions.

From the foregoing, it will be seen that this invention is one well adapted to attain all of the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. An apparatus for cooking foods, said apparatus comprising
    a food cooking means capable of cooking said foods when brought into the cooking environment thereof,
    a carrier, said carrier operable to support preselected amounts of food thereon, said carrier having a time programming mechanism mounted thereon which may be adjustably set to represent the time period said carrier supported food is to be exposed to said cooking means environment for optimum cooking results,
    a conveyor means for moving said carrier into and out of said cooking means environment,
    a timer means actuated by said mechanism for controlling said conveyor means thereby limiting the time said carrier supported food is exposed to said cooking means environment to that which corresponds to the programming of said time programming mechanism.

2. The invention as in claim 1 wherein said time programming mechanism includes an adjustable projection, said projection being movable to a plurality of positions, each position representing a possible selectable time period that said carrier supported food is to be exposed to said cooking means environment.

3. The invention as in claim 2 wherein said timer means includes a means for sensing the position of said adjustable projection and a circuit means for controlling said conveyor means in accordance with the operation of said sensing means.

4. The invention as in claim 3 wherein said sensing means includes a swingable lever arm, said lever arm being swingable in an arc due to the relative movement between same and said adjustable projection, the angular dimension of said arc correlating to said programmed time period for cooking the food on said carrier.

5. The invention as in claim 4 wherein said apparatus includes a time memory device, said memory device interconnected with said swingable lever arm to record said programmed time period and to operate said conveyor circuit controlling means therefrom.

6. The invention as in claim 3 wherein said apparatus forms a single line conveyor system and wherein said sensing means senses the condition of said time programming mechanism prior to its associated carrier being exposed to said cooking means environment.

7. The invention as in claim 3 wherein said conveyor circuit controlling means controls the movement of said carrier in said cooking means environment in accordance with its own time program and in accordance with the condition of the time programming mechanism associated with the next carrier about to be brought into said cooking means environment.

8. The invention as in claim 1 wherein said timer means includes a means for sensing the condition of said time programming mechanism, and a circuit means for controlling said conveyor means in accordance with the operation of said sensing means.

9. The invention as in claim 8 wherein said conveyor controlling means includes a means for monitoring the condition of said cooking means and for reversing the direction of said conveyor means in accordance with preselected cooking means conditions.

10. The invention as in claim 9 including a means for precluding the reversing of said conveyor means when said food therein is within a preselected time period of having said cooking process completed.

11. The invention as in claim 8 wherein said apparatus forms a single line conveyor system and wherein a preselected time program on a carrier about to be brought into said cooking means environment modifies the movement of said carrier presently in said cooking means environment.

12. The invention as in claim 8 wherein said apparatus forms a single line conveyor, said cooking means having cooking space therein for at least two carriers at the same time, said circuit means having monitoring means for monitoring the space available within said cooking means and for controlling the movement of carriers into same.

13. The invention as in claim 12 wherein said timer means includes means for changing the condition of said monitoring means in accordance with a cooking time period having been completed thereby permitting said conveyor means to remove said carrier supporting the cooked food from further exposure to said cooking means environment.

14. The invention as in claim 13 wherein said circuit means includes a means for bypassing said timer means thereby permitting the arbitrary removal of a carrier from said cooking means by said conveyor means.

15. The invention as in claim 1 wherein said timer means includes
    means for sensing the condition of said time programming mechanism,
    means for starting the timing of the time period represented by said time programming mechanism, and
    means for producing an electrical output at the end of said time period represented by said time programming mechanism, said output being utilized to initiate the operation of said conveyor means.

16. A method for cooking food by exposing same to a cooking environment for various periods of time, said method comprising the steps of:
    locating preselected amounts of said food on carriers suitable for conveying in a single line conveyor;
    setting a time program for exposure to said cooking environment on a device located on each carrier having said food therein; controlling the time said carrier is exposed to said cooking environment by movement of said carrier, and
    conveying said carrier into said cooking environment for a time period determined by the time program on said carrier.

17. The invention as in claim 16 including the step of modifying the movement of said carriers into and out of said cooking environment depending on the time program of the preceding and following carriers as well as the time program setting on said carriers.

18. The invention as in claim 16 including the step of shaking said food as said carriers move through said cooking environment.

19. The invention as in claim 16 wherein said carriers have at least a first and second position within said cooking environment and wherein said modifying step includes the step reversing the movement of a carrier in said second position to said first position when the time program setting on said carrier in said second position is less than the time setting on an incoming carrier.

20. The invention as in claim 19 including the step of precluding the reverse movement of said carrier when the food therein is within a preselected time period of having its cooking completed.

21. The invention as in claim 16 including the step of bypassing said controlling step and removing said carrier arbitrarily from said cooking environment.

22. The invention as in claim 16 wherein said carriers have at least a first and second position within said cooking environment and wherein said modifying step includes the steps of selecting a time when said carrier movement should be reversed and reversing the movement of said carrier in said second position to said first position in accordance with said selecting step.

References Cited
UNITED STATES PATENTS

| | | | |
|---|---|---|---|
| 2,477,805 | 8/1949 | Hummel | 99—336 |
| 2,616,359 | 11/1952 | Pierson | 99—407 |
| 2,880,663 | 4/1959 | Simjian. | |
| 2,980,554 | 4/1961 | Mills | 99—107 X |
| 3,372,635 | 3/1968 | Meyer. | |

FRANK W. LUTTER, Primary Examiner

U.S. Cl. X.R.

99—407, 336